(12) United States Patent
Pesola et al.

(10) Patent No.: US 6,907,419 B1
(45) Date of Patent: Jun. 14, 2005

(54) METHOD, SYSTEM, AND PRODUCT FOR MAINTAINING WITHIN A VIRTUALIZATION SYSTEM A HISTORICAL PERFORMANCE DATABASE FOR PHYSICAL DEVICES

(75) Inventors: Troy Raymond Pesola, Champlin, MN (US); Ravi Kumar Kavuri, Inver Grove Heights, MN (US); Michael W. Booth, Apple Valley, MN (US)

(73) Assignee: Storage Technology Corporation, Louisville, CO (US)

( * ) Notice: Subject to any disclaimer, the term of this patent is extended or adjusted under 35 U.S.C. 154(b) by 442 days.

(21) Appl. No.: 10/083,982

(22) Filed: Feb. 27, 2002

(51) Int. Cl.[7] .......................... G06F 17/00; G06F 9/455; G06F 9/46
(52) U.S. Cl. .................. 707/1; 707/100; 718/1; 718/100; 718/101
(58) Field of Search .................. 707/1–3, 7, 10, 707/100–102, 200, 201

(56) References Cited

U.S. PATENT DOCUMENTS 6,400,996 B1 * 6/2002 Hoffberg et al. .............. 700/83
6,671,699 B1 * 12/2003 Black et al. ................ 707/201

* cited by examiner

Primary Examiner—Alford W. Kindred
(74) Attorney, Agent, or Firm—Yee & Associates, P.C.

(57) ABSTRACT

A data processing system, method, and product are disclosed for maintaining a database of usage information of multiple, different physical devices. A virtualization system is provided interposed between a host computer system and the physical devices. The host computer system is capable of accessing only virtual interfaces and is incapable of directly accessing any of the physical devices. A relational database is established within the virtualization system for storing information. Information is stored in the database about transactions processed by the virtualization system utilizing the physical devices. The information stored in the database includes error information and information about the usage of the physical devices. The information in the database may be accessed by the host computer system.

99 Claims, 1 Drawing Sheet

METHOD, SYSTEM, AND PRODUCT FOR MAINTAINING WITHIN A VIRTUALIZATION SYSTEM A HISTORICAL PERFORMANCE DATABASE FOR PHYSICAL DEVICES

BACKGROUND OF THE INVENTION

1. Field of the Invention

The present invention relates to data processing systems, and more particularly to a data processing system, method, and computer program product for maintaining a relational database in a virtualization system of usage information of multiple, different physical devices in a system that implements virtual storage devices.

2. Background of the Invention

In some known data processing systems, a server computer system is coupled directly to its storage devices, such as tape drives and/or disk drives. To perform a backup operation to a tape drive, for example, the server computer system commands the tape library to mount a specific physical tape cartridge into a specific physical tape drive. The application running on the server can then directly access the physical tape drive. Any warning or errors encountered can be managed by the server through the application. It is possible for this error information to be used by the application to perform preventative maintenance on the physical storage devices. The problem with this environment is that the storage administration resides on the server. The server has access to only its own storage devices. These storage devices cannot be shared with other servers.

Storage virtualization has been used to overcome the limitations that arise when a server is coupled directly to its storage devices. In a system that implements storage virtualization, the server computer systems are isolated from the physical storage devices by a virtual representation of the storage system. The storage system is a pool of physical storage devices, such as disk drives and tape drives. This approach permits the sharing of the physical storage devices among the server computer systems. Each server has access to one or more virtual storage devices. These virtual storage devices are logical devices maintained by the virtual interface. The virtual interface maps the virtual storage devices to physical devices. When an application running on one of the servers wants to access data on ore of its virtual interfaces, the server identifies the virtual interface. For example, when a server wants to perform a backup, the application commands the tape library to mount a physical tape cartridge into a virtual tape drive. The virtual interface then intercepts the command, modifies the request to translate this virtual tape drive to a physical tape drive, and creates a mapping from this physical device to the virtual interface.

Storage virtualization hides warnings and errors from the server, however. The server knows about only the virtual interface. Usage information about the physical device is not available to the server. Although, the virtual interface logs some limited information about what occurs with the physical storage devices, the log is a continuous event log that combines very minimal information about events that occurred in the physical devices. The log is a single, sequential string of events occurring in various physical devices kept in the log in the sequential order in which the events occurred. Events are placed in the log in the order in which they occur without regard to where the event occurred. Thus, an event occurring in a first storage device may be logged followed by an event occurring in a second storage device followed by an event occurring back in the first storage device. It does not maintain a separate log for each device. Further, information about which physical device was used and the history of usage is not recorded. This log is not available to the servers. They may not access it.

The StorageNet 6000, available from Storage Technology Corporation, is an example of a system that implements a virtual interface. The SN6000 presents a virtualization system for tape drives. The system presents virtual tape drives to servers, and dynamically maps these virtual interfaces to the physical tape drives as needed. When errors occur in the system, it is very difficult for the server to determine where the error occurred since it does not have information about which physical device was being used. When an error occurs, a host attributes the error to the virtual interface that the host is coupled to, and not the physical device.

Therefore, a need exists for a method, system, and product for maintaining a relational database within the virtual interface of information about usage of physical storage devices in a system that implements virtual storage devices.

SUMMARY OF THE INVENTION

A data processing system, method, and product are disclosed for maintaining a relational database of usage information of multiple, different physical devices. A virtualization system is provided interposed between a host computer system and the physical devices. The host computer system is capable of accessing only virtual interfaces and is incapable of directly accessing any of the physical devices. A relational database is established within the virtualization system for storing information. Information is stored in the database about transactions processed by the virtualization system utilizing the physical devices. The information stored in the database includes error information and information about the usage of the physical devices. The information in the database may be accessed by the host computer system.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
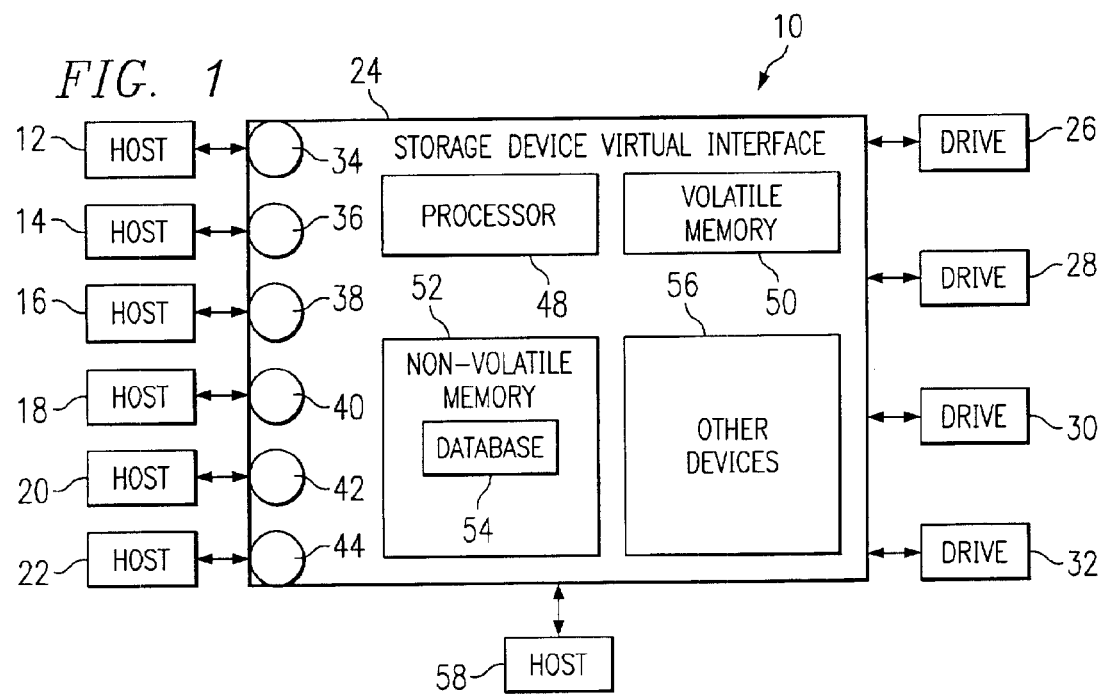
FIG. 1 depicts a block diagram of a data processing system that includes a plurality of host computer systems coupled to a plurality of physical drives utilizing a storage device virtual interface.

A preferred embodiment of the present invention and its advantages are better understood by referring to the figures, like numerals being used for like and corresponding parts of the accompanying figures.

The present invention is a system, method, and computer program product for maintaining a relational database of usage information of multiple, different physical storage devices. The system implements virtual storage devices utilizing a virtualization system interposed between host computer systems and the physical storage devices. The host computer systems are capable of accessing only virtual interfaces and are incapable of directly accessing any of the physical storage devices.

In the example depicted in the preferred embodiment, the term "virtual interface" is used to mean a virtual storage device. However, those skilled in the art will recognize that a virtual interface may include any type of virtual interface between a host and any type of physical device. For example, a virtual interface can be a file, a library, a drive, a volume, or any other type of interface. Further, a combination of different types of virtual interfaces can be simultaneously used in a single virtualization system. In addition, the physical device is not limited to a physical storage device, but may include any other type of physical device.

A relational database is implemented within the virtualization system. The virtualization system receives transactions from a host computer system to access virtual storage devices. For each transaction, the virtualization system modifies the transaction to translate the virtual storage device to the physical storage device that has been mapped to the virtual storage device. Information is collected from each transaction processed by the virtualization system and is stored in the database.

The data in the relational database is associated such that transactions can be tracked by searching on a particular physical device, a particular connection from a host to a virtual interface, a particular data movement such as several transactions, or other data. By searching on one type of data item, for example one particular physical device, data associated with all other transactions for which data was stored for that type of data item will be returned.

For example, if a search is performed for information about a particular physical device, all information stored about that physical device will be returned. This information will typically have been stored in response to many different transactions.

The information collected for each transaction includes, but is not limited to, one or more of the following: an identification of the transaction, an identification of the virtual storage device accessed by the transaction, an identification of the physical storage device that is mapped to this virtual storage device, a particular physical device such as a tape cartridge, hub, or switch, usage information such as the date, time of day, and/or duration of the data access, data information such as amount of data read from or written to the physical storage device, and/or the data rate, and/or any other information associated with the transaction and/or physical devices.

The information stored in the database may be accessed by any one of the hosts coupled to the virtualization system in order to perform a performance analysis of one or more of the physical storage devices. In addition, other hosts, which are not coupled to the virtual interfaces, may also access the database in order to perform a performance analysis. Thus, preventative maintenance may be performed using this information by any host, whether or not the host is coupled to a virtual interface.

Error information may also be stored in the database. When an error occurs, the virtualization system will identify one of the transactions it has or is processing that is associated with the error, i.e. the virtualization system will determine which transaction was processed that resulted in the error. Information about the error is collected and stored in the database. The information collected includes an identification of the type of error, the device in which the error occur, and any other information typically collected when an error occurs.

FIG. 1 depicts a block diagram of a data processing system 10 that includes a plurality of host computer systems coupled to a plurality of physical drives utilizing a storage device virtual interface. Hosts 12, 14, 16, 18, 20, and 22 are coupled to a storage device interface 24. Physical drives 26, 28, 30, and 32 are also coupled to storage device interface 24. These hosts may be homogeneous, i.e. similar systems executing the same operating system, or they may be heterogenous, i.e. different physical platforms executing different operating systems, or any combination of physical platforms and operating systems. In addition, the physical drives may be any combination of disk drives and/or tape drives and may be homogeneous or heterogeneous.

Storage device virtual interface 24 is interposed between the hosts and the physical storage devices.

The physical drives are dynamically managed by the virtual interface 24 as a pool of resources. These physical drives are shared among the various hosts. The virtual interface 24 maps the virtual interfaces 34, 36, 38, 40, 42, and 44 to a pool of physical devices 26, 28, 30, and 32. Virtual interface 24 receives access requests for a particular virtual interface, identifies the physical device mapped to the virtual interface, and assigns the request to the appropriate physical device.

Included within virtual interface 24 is a processor 48, volatile memory 50, non-volatile memory 52, and other devices 56. Within non-volatile memory 52 is a relational database 54.

Database 54 includes information about each transaction processed by virtual interface 24. The information includes a transaction identifier, an identifier of the virtual interface identified by the transaction, and an identifier of one or more physical devices including the physical device assigned to this virtual interface, and other physical devices such as a cartridge, a hub, switch and other physical devices that are accessed or used during the transaction. The information also includes usage information, such as the date, time, and duration of the transaction. Data information, such as amount of data read from or written to the physical device, and the data rate are maintained in the database. Any other information about the transaction and/or virtual and physical devices involved is obtained and stored in the database.

Error, warning, failure, exception, and/or fault information is also stored in database 54.

The information stored in database 54 may be accessed by a host and may be used to monitor device usage, tape media usage, warning, and error conditions to perform preventative maintenance. The information may be accessed by a host coupled to a virtual interface, such as host 12, 14, 16, 18, 20, or 22, or a host, such as host 58, which is coupled to interface 24 but which is not coupled to a virtual interface. For example, consider a physical tape cartridge that has a marginal error that only exhibits itself in a specific tape drive. If this tape cartridge is used in another tape device, that data is read correctly. If another tape cartridge is used in the tape drive in question, data can be read without error. A problem occurs only when the two are used together. This type of condition cannot be captured in a system that uses storage virtualization without the database of the present invention. The present invention captures this condition in the database because all of the information about the tape cartridges and physical tape drives are stored.

Figure 2:
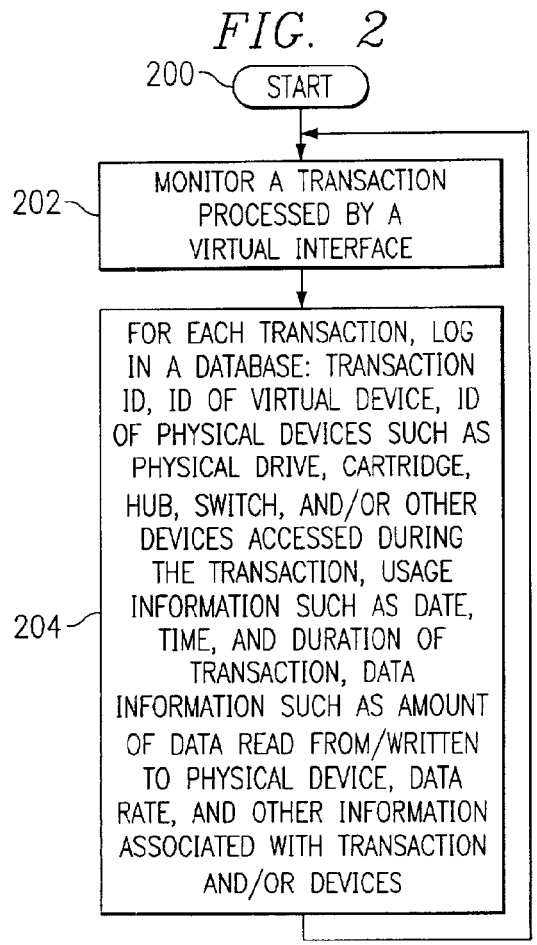
FIG. 2 depicts a high level flow chart which depicts storing data in a database within a storage device virtual interface in accordance with the present invention.

FIG. 2 is a high level flow chart which depicts storing data in a database within a storage device virtual interface in accordance with the present invention. The process starts as depicted by block 200 and thereafter passes to block 202 which illustrates monitoring a transaction processed by the virtual interface. Next, block 204 depicts the logging in a relational database for each transaction information about the transaction. The information includes a transaction identifier, an identifier of the virtual interface identified by the transaction, and an identifier of one or more physical devices including one or more physical devices assigned to this virtual interface, and other physical devices such as a cartridge, a hub, switch and other physical devices that are accessed or used during the transaction. The information also includes usage information, such as the date, time, and duration of the transaction. Data information, such as amount of data read from or written to the physical device, and the data rate are maintained in the database. Any other information about the transaction and/or virtual and physical devices involved is obtained and maintained in the database. The process then passes back to block 202.

Figure 3:
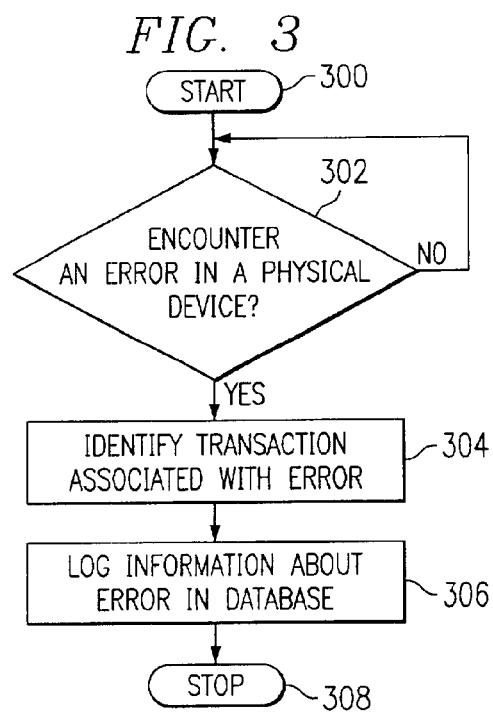
FIG. 3 illustrates a high level flow chart which depicts storing error information in a database within a storage device virtual interface in accordance with the present invention.

FIG. 3 is a high level flow chart which depicts storing error information in a database within a storage device virtual interface in accordance with the present invention. The process starts as depicted by block 300 and thereafter passes to block 302 which illustrates a determination of whether or not an error in a physical device has been encountered. If a determination is made that an error has not occurred, the process passes back to block 302. Referring again to block 302, if a determination is made that an error has occurred, the process passes to block 304 which depicts identifying the transaction associated with this error. Block 306, then, illustrates logging information about this error in the relational database. The information logged about the error will include information about the physical and virtual interfaces identified by the transaction. The information may also include the type of error, date and time the error occurred, and any other information that may be obtained about the error. The process then terminates as depicted by block 308.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for maintaining a database of usage information of a plurality of physical devices, said method comprising the steps of:

providing a virtualization system interposed between a host computer system and a plurality of physical devices, wherein said host computer system is capable of accessing virtual interfaces and is incapable of directly accessing any of said plurality of physical devices;

establishing a database within said virtualization system for storing information;

storing, within said database, information about transactions processed by said virtualization system utilizing said plurality of physical devices;

detecting an error in one of said plurality of physical devices occurring during processing of one of a plurality of transactions;

identifying said one of said plurality of physical devices having said error;

identifying said one of said plurality of transactions associated with said error; and storing information about said error including said identification of said one of plurality transactions and said identification of said one of said plurality of physical devices in said database.

2. The method according to claim 1, further comprising the step of accessing, utilizing said host computer system, said database.

3. The method according to claim 2, further comprising the step of utilizing said database by said host computer system to analyze performance of said plurality of physical devices.

4. The method according claim 1, further comprising the steps of:

detecting an error in one of said plurality of physical devices; and storing information about said error in said database.

5. The method according to claim 1, further comprising the step of storing, within said database, information about a usage of each one of said plurality of storage devices.

6. The method according to claim 1, further comprising the step of for each one of said plurality of physical devices, maintaining a separate history within said database of usage of each one of said plurality of storage devices.

7. The method according to claim 1, further comprising the step of storing said information about said error in said database with an entry associated with said one of said identified one of said plurality of physical devices.

8. The method according to claim 1, further comprising the steps of:

processing, within said virtualization system, a transaction between said host computer system and a first virtual interface by translating said first virtual interface to one of said plurality of physical devices associated with said first virtual interface; and storing, in said database, information about said transaction.

9. The method according to claim 8, further comprising the steps of:

maintaining a separate history within said database of usage of each one of said plurality of physical devices; and storing said information in a history associated with said one of said plurality of physical devices.

10. The method according to claim 8, further comprising the step of monitoring, utilizing said virtualization system, said transaction.

11. The method according to claim 8, further comprising the steps of:
collecting, utilizing said virtualization system, an identification of said first virtual interface; and
storing said identification of said first virtual interface in said entry associated with said transaction.

12. The method according to claim 8, further comprising the steps of:
collecting, utilizing said virtualization system, an identification of said one of said plurality of physical devices associated with said first virtual interface; and
storing said identification of said one of said plurality of physical devices in said entry associated with said transaction.

13. The method according to claim 8, further comprising the steps of:
collecting, utilizing said virtualization system, an identification of a physical device utilized during said transaction; and
storing said identification of said physical device in said entry associated with said transaction.

14. The method according to claim 13, wherein the step of collecting an identification of a physical device further comprises the step of collecting an identification of a particular tape cartridge.

15. The method according to claim 13, wherein the step of collecting an identification of a physical device further comprises the step of collecting an identification of a particular hub.

16. The method according to claim 13, wherein the step of collecting an identification of a physical device further comprises the step of collecting an identification of a particular switch.

17. The method according to claim 13, wherein the step of collecting an identification of a physical device further comprises the step of collecting an identification of a particular tape drive.

18. The method according to claim 8, further comprising the steps of:
collecting, utilizing said virtualization system, information about a data transfer executed during said transaction; and
storing said information about said data transfer in said database.

19. The method according to claim 18, wherein the step of collecting information about a data transfer further comprises the step of collecting information about a date of said data transfer.

20. The method according to claim 18, wherein the step of collecting information about a data transfer further comprises the step of collecting information about a time of day of said data transfer.

21. The method according to claim 18, wherein the step of collecting information about a data transfer further comprises the step of collecting information about a duration of said data transfer.

22. The method according to claim 1, further comprising the step of storing, within said database, information about errors in said plurality of physical devices occurring during said transactions.

23. The method according to claim 1, wherein said virtual interfaces are virtual storage devices.

24. The method according to claim 1, wherein said virtual interfaces are virtual libraries.

25. The method according to claim 1, wherein said virtual interfaces are virtual volumes.

26. The method according to claim 1, wherein said virtual interfaces are virtual drives.

27. The method according to claim 1, wherein said virtual interfaces are virtual disk drives.

28. The method according to claim 1, wherein said virtual interfaces are virtual tape drives.

29. The method according to claim 1, wherein said virtual interfaces are a combination of different virtual interfaces.

30. The method according to claim 29, wherein said virtual interfaces are virtual storage devices and virtual libraries.

31. The method according to claim 1, wherein said physical devices are physical storage devices.

32. The method according to claim 1, wherein said physical devices are physical disk drives.

33. The method according to claim 1, wherein said physical devices are physical tape drives.

34. A data processing system for maintaining a database of usage information of a plurality of physical devices, comprising:
means for providing a virtualization system interposed between a host computer system and a plurality of physical devices, wherein said host computer system is capable of accessing virtual interfaces and is incapable of directly accessing any of said plurality of physical devices;
a database established within said virtualization system for storing information;
means for storing, within said database, information about transactions processed by said virtualization system utilizing said plurality of physical devices;
means for detecting an error in one of said plurality of physical devices occurring during processing of one of a plurality of transactions;
means for identifying said one of said plurality of physical devices having said error;
means for identifying said one of said plurality of transactions associated with said error; and
means for storing information about said error including said identification of said one of plurality of transactions and said identification of said one of said plurality of physical devices in said database.

35. The system according to claim 34, further comprising means for accessing, utilizing said host computer system, said database.

36. The system according to claim 35, further comprising means for utilizing said database by said host computer system to analyze performance of said plurality of physical devices.

37. The system according claim 34, further comprising:
means for detecting an error in one of said plurality of physical devices; and
means for storing information about said error in said database.

38. The system according to claim 34, further comprising means for storing, within said database, information about a usage of each one of said plurality of storage devices.

39. The system according to claim 34, further comprising for each one of said plurality of physical devices, means for maintaining a separate history within said database of usage of each one of said plurality of storage devices.

40. The system according to claim 34, further comprising means for storing said information about said error in said database with an entry associated with said one of said identified one of said plurality of physical devices.

41. The system according to claim 34, further comprising:
means for processing, within said virtualization system, a transaction between said host computer system and a first virtual interface by translating said first virtual interface to one of said plurality of physical devices associated with said first virtual interface; and
means for storing, in said database, information about said transaction.

42. The system according to claim 41, further comprising:
means for maintaining a separate history within said database of usage of each one of said plurality of physical devices; and
means for storing said information in a history associated with said one of said plurality of physical devices.

43. The system according to claim 41, further comprising means for monitoring, utilizing said virtualization system, said transaction.

44. The system according to claim 41, further comprising:
means for collecting, utilizing said virtualization system, an identification of said first virtual interface; and
means for storing said identification of said first virtual interface in said entry associated with said transaction.

45. The system according to claim 41, further comprising:
means for collecting, utilizing said virtualization system, an identification of said one of said plurality of physical devices associated with said first virtual interface; and
means for storing said identification of said one of said plurality of physical devices in said entry associated with said transaction.

46. The system according to claim 41, further comprising:
means for collecting, utilizing said virtualization system, an identification of a physical device utilized during said transaction; and
means for storing said identification of said physical device in said entry associated with said transaction.

47. The system according to claim 46, wherein said means for collecting an identification of a physical device further comprises means for collecting an identification of a particular tape cartridge.

48. The system according to claim 46, wherein said means for collecting an identification of a physical device further comprises means for collecting an identification of a particular hub.

49. The system according to claim 46, wherein said means for collecting an identification of a physical device further comprises means for collecting an identification of a particular switch.

50. The system according to claim 46, wherein said means for collecting an identification of a physical device further comprises means for collecting an identification of a particular tape drive.

51. The system according to claim 41, further comprising:
means for collecting, utilizing said virtualization system, information about a data transfer executed during said transaction; and
means for storing said information about said data transfer in said database.

52. The system according to claim 51, wherein said means for collecting information about a data transfer further comprises means for collecting information about a date of said data transfer.

53. The system according to claim 51, wherein said means for collecting information about a data transfer further comprises means for collecting information about a time of day of said data transfer.

54. The system according to claim 51, wherein said means for collecting information about a data transfer further comprises means for collecting information about a duration of said data transfer.

55. The system according to claim 34, further comprising means for storing, within said database, information about errors in said plurality of physical devices occurring during said transactions.

56. The system according to claim 34, wherein said virtual interfaces are virtual storage devices.

57. The system according to claim 34, wherein said virtual interfaces are virtual libraries.

58. The system according to claim 34, wherein said virtual interfaces are virtual volumes.

59. The system according to claim 34, wherein said virtual interfaces are virtual drives.

60. The system according to claim 34, wherein said virtual interfaces are virtual disk drives.

61. The system according to claim 34, wherein said virtual interfaces are virtual tape drives.

62. The system according to claim 34, wherein said virtual interfaces are a combination of different virtual interfaces.

63. The system according to claim 62, wherein said virtual interfaces are virtual storage devices and virtual libraries.

64. The system according to claim 34, wherein said physical devices are physical storage devices.

65. The system according to claim 34, wherein said physical devices are physical disk drives.

66. The system according to claim 34, wherein said physical devices are physical tape drives.

67. A computer program product for maintaining a database of usage information of a plurality of physical devices, said product comprising:
instruction means for providing a virtualization system interposed between a host computer system and a plurality of physical devices, wherein said host computer system is capable of accessing virtual interfaces and is incapable of directly accessing any of said plurality of physical devices;
instruction means for establishing a database within said virtualization system for storing information;
instruction means for storing, within said database, information about transactions processed by said virtualization system utilizing said plurality of physical devices;
instruction means for detecting an error in one of said plurality of physical devices occurring during processing of one of a plurality of transactions;
instruction means for identifying said one of said plurality of physical devices having said error;
instruction means for identifying said one of said plurality of transactions associated with said error; and
instruction means for storing information about said error including said identification of said one of plurality of transactions and said identification of said one of said plurality of physical devices in said database.

68. The product according to claim 67, further comprising instruction means for accessing, utilizing said host computer system, said database.

69. The product according to claim 68, further comprising instruction means for utilizing said database by said host computer system to analyze performance of said plurality of physical devices.

70. The product according claim 67, further comprising:
instruction means for detecting an error in one of said plurality of physical devices; and
instruction means for storing information about said error in said database.

71. The product according to claim 67, further comprising instruction means for storing, within said database, information about a usage of each one of said plurality of storage devices.

72. The product according to claim 67, further comprising for each one of said plurality of physical devices, instruction means for maintaining a separate history within said database of usage of each one of said plurality of storage devices.

73. The product according to claim 67, further comprising instruction means for storing said information about said error in said database with an entry associated with said one of said identified one of said plurality of physical devices.

74. The product according to claim 67, further comprising:
instruction means for processing, within said virtualization system, a transaction between said host computer system and a first virtual interface by translating said first virtual interface to one of said plurality of physical devices associated with said first virtual interface; and
instruction means for storing, in said database, information about said transaction.

75. The product according to claim 74, further comprising:
instruction means for maintaining a separate history within said database of usage of each one of said plurality of physical devices; and
instruction means for storing said information in a history associated with said one of said plurality of physical devices.

76. The product according to claim 74, further comprising instruction means for monitoring, utilizing said virtualization system, said transaction.

77. The product according to claim 74, further comprising:
instruction means for collecting, utilizing said virtualization system, an identification of said first virtual interface; and
instruction means for storing said identification of said first virtual interface in said entry associated with said transaction.

78. The product according to claim 74, further comprising:
instruction means for collecting, utilizing said virtualization system, an identification of said one of said plurality of physical devices associated with said first virtual interface; and
instruction means for storing said identification of said one of said plurality of physical devices in said entry associated with said transaction.

79. The product according to claim 74, further comprising:
instruction means for collecting, utilizing said virtualization system, an identification of a physical device utilized during said transaction; and
instruction means for storing said identification of said physical device in said entry associated with said transaction.

80. The product according to claim 79, wherein said instruction means for collecting an identification of a physical device further comprises instruction means for collecting an identification of a particular tape cartridge.

81. The product according to claim 79, wherein said instruction means for collecting an identification of a physical device further comprises instruction means for collecting an identification of a particular hub.

82. The product according to claim 79, wherein said instruction means for collecting an identification of a physical device further comprises instruction means for collecting an identification of a particular switch.

83. The product according to claim 79, wherein said instruction means for collecting an identification of a physical device further comprises instruction means for collecting an identification of a particular tape drive.

84. The system according to claim 74, further comprising:
instruction means for collecting, utilizing said virtualization system, information about a data transfer executed during said transaction; and
instruction means for storing said information about said data transfer in said database.

85. The product according to claim 74, wherein said instruction means for collecting information about a data transfer further comprises instruction means for collecting information about a date of said data transfer.

86. The product according to claim 74, wherein said instruction means for collecting information about a data transfer further comprises instruction means for collecting information about a time of day of said data transfer.

87. The product according to claim 74, wherein said instruction means for collecting information about a data transfer further comprises instruction means for collecting information about a duration of said data transfer.

88. The product according to claim 67, further comprising instruction means for storing, within said database, information about errors in said plurality of physical devices occurring during said transactions.

89. The product according to claim 67, wherein said virtual interfaces are virtual storage devices.

90. The product according to claim 67, wherein said virtual interfaces are virtual libraries.

91. The product according to claim 67, wherein said virtual interfaces are virtual volumes.

92. The product according to claim 67, wherein said virtual interfaces are virtual drives.

93. The product according to claim 67, wherein said virtual interfaces are virtual disk drives.

94. The product according to claim 67, wherein said virtual interfaces are virtual tape drives.

95. The product according to claim 67, wherein said virtual interfaces are a combination of different virtual interfaces.

96. The product according to claim 95, wherein said virtual interfaces are virtual storage devices and virtual libraries.

97. The product according to claim 67, wherein said physical devices are physical storage devices.

98. The product according to claim 67, wherein said physical devices are physical disk drives.

99. The product according to claim 67, wherein said physical devices are physical tape drives.

* * * * *